United States Patent
Vasudevan et al.

(10) Patent No.: US 7,069,407 B1
(45) Date of Patent: Jun. 27, 2006

(54) METHOD AND APPARATUS FOR A MULTI-CHANNEL HIGH SPEED FRAMER

(75) Inventors: Velamur Krishnamachari Vasudevan, Bangalore (IN); Ponnusamy Kanagaraju, Bangalore (IN); Vatan Kumar Verma, Betul Bazar (IN)

(73) Assignee: Cypress Semiconductor Corporation, San Jose, CA (US)

( * ) Notice: Subject to any disclaimer, the term of this patent is extended or adjusted under 35 U.S.C. 154(b) by 634 days.

(21) Appl. No.: 10/327,456

(22) Filed: Dec. 20, 2002

(51) Int. Cl.
*G06F 12/00* (2006.01)

(52) U.S. Cl. .................... 711/169; 711/154; 709/236
(58) Field of Classification Search .................... None
See application file for complete search history.

(56) References Cited

U.S. PATENT DOCUMENTS

| | | | |
|---|---|---|---|
| 4,920,483 A | 4/1990 | Pogue et al. | |
| 4,965,794 A | 10/1990 | Smith | |
| 5,079,693 A | 1/1992 | Miller | |
| 5,182,651 A | 1/1993 | Kishi | |
| 5,291,586 A | 3/1994 | Jen et al. | |
| 5,471,628 A | 11/1995 | Phillips et al. | |
| 5,825,770 A * | 10/1998 | Coady et al. | 370/378 |
| 5,844,923 A * | 12/1998 | Condon | 714/798 |
| 5,964,835 A | 10/1999 | Fowler et al. | |
| 6,347,097 B1 | 2/2002 | Deng | |
| 6,442,669 B1 * | 8/2002 | Wright et al. | 712/19 |
| 6,584,584 B1 | 6/2003 | Smith | |
| 6,640,297 B1 | 10/2003 | Banning et al. | |
| 6,957,309 B1 | 10/2005 | Gupta et al. | |
| 2004/0117584 A1 | 6/2004 | Banerjee et al. | |

OTHER PUBLICATIONS

Nilam Ruparelia, *Delivering Ethernet Over Sonet Using Virtual Concatenation*, CommsDesign, Feb. 25, 2002, 8 pages, www.commsdesign.com/story/OEG20020225S0078.
Louis E. Frenzel, *Programmable Framer Chip Improves OC-48 Efficiency*, Electronic Design, Apr. 16, 2001, 4 pages.
Michael Timothy Moore, *Filling the WAN-Communications-Line Card*, designfeature, Apr. 18, 2002, 5 pages, www.ednmag.com.

* cited by examiner

*Primary Examiner*—Mano Padmanabhan
*Assistant Examiner*—Paul Baker
(74) *Attorney, Agent, or Firm*—Blakely, Sokoloff, Taylor & Zafman LLP (57) ABSTRACT

A method and apparatus for a multi-channel high speed framer is described. In one embodiment, the invention is an apparatus. The apparatus includes a first plurality of pipeline stages suitable for data framing between a link layer and a network interface. The apparatus also includes a first memory coupled to each pipeline stage of the first plurality of pipeline stages, the first memory to store context information at predetermined stage locations for each pipeline stage. The apparatus further includes a first control logic coupled to the first memory and to each pipeline stage of the first plurality of pipeline stages, the first control logic to control transfer of data between the first memory and the first plurality of pipeline stages. Within the apparatus, each stage of the first plurality of pipeline stages is suitable for loading the context information from the first memory through first control logic and performing a sub-function of data framing.

26 Claims, 6 Drawing Sheets

FIG. 5

METHOD AND APPARATUS FOR A MULTI-CHANNEL HIGH SPEED FRAMER

FIELD

The invention generally relates to methods and apparatuses used in communications and more specifically to methods and hardware for communications over long-range networks.

BACKGROUND

In general, networks and computers operate in different manners. Networks operate by transferring data in streams and/or packets. Streams may be bit-sized, byte-sized, or otherwise broken down. Packets may be of relatively large size, such as 64, 512, or more bytes each. Computers operate by processing data, typically in well-defined small sizes, such as bytes (8 bits), words (16 bits), double words (32 bits) and so on. At the interface between a computer and a network, a translation or reorganization of data may be necessary. This may include reorganizing data from a series of packets into a format useful to a processor. In particular, this may include taking data bits of a series of bytes and reorganizing them into a form including only data bits. A similar problem may occur at a byte-level, wherein some bytes of a group of bytes are data bytes, and other bytes are effectively control bytes which need to be parsed out of data.

Figure 1:
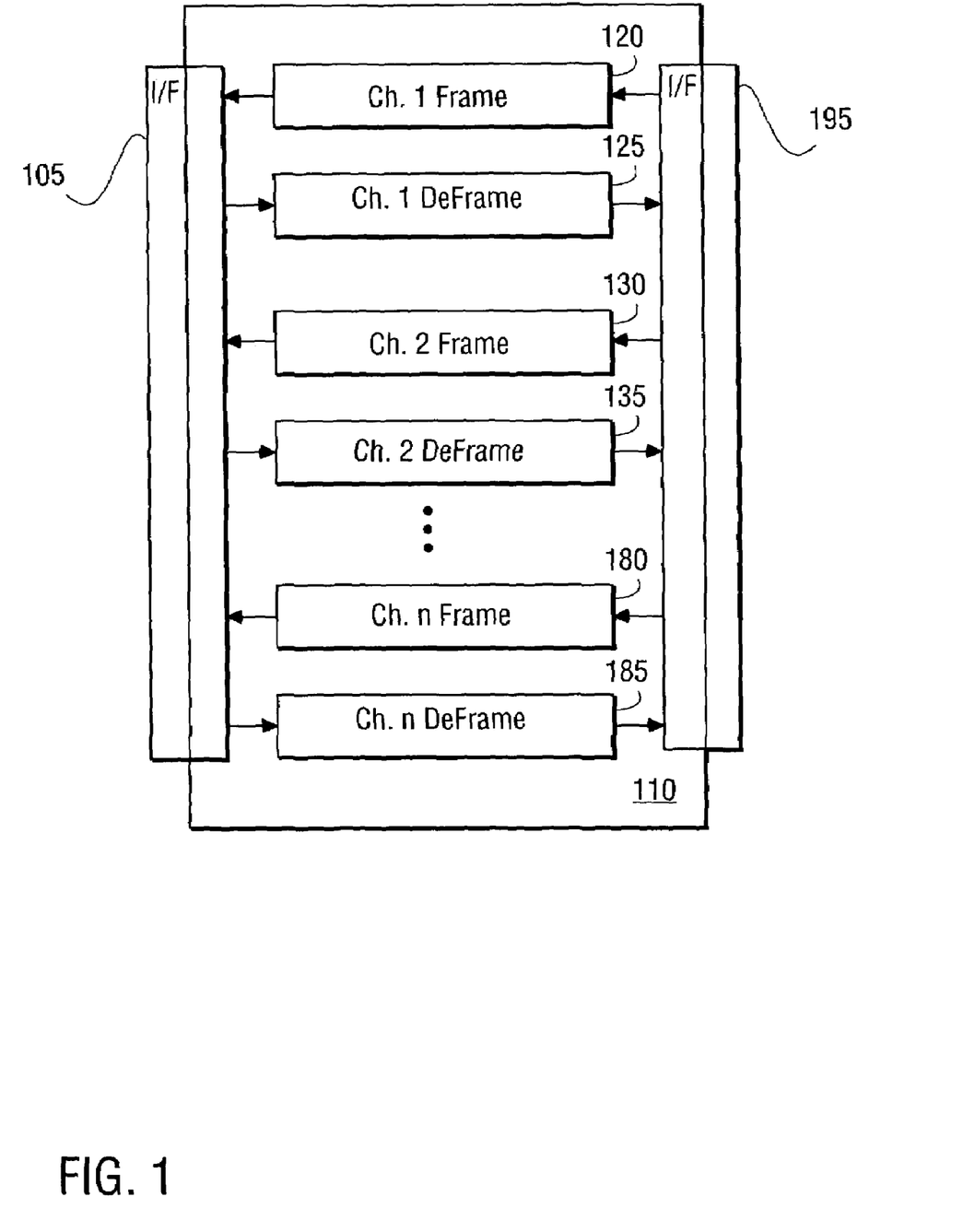
FIG. 1 illustrates an embodiment of a conventional framer.

The data transferred on a network is typically transferred as part of a frame, which may be similar to but distinct from a packet in some circumstances. FIG. 1 illustrates an embodiment of a conventional framer. Framer 110 is designed for coupling to a physical link layer through a first interface 105 and for coupling to a network processor for example through a second interface 195. Coupled to each of interfaces 105 and 195 are a series of frame and deframe modules, each dedicated to a single channel. Channel 1 frame module 120 frames data for transmission and channel 1 deframe module 125 deframes received data for channel 1. Similarly, Channel 2 frame module 130 frames data for transmission and channel 2 deframe module 135 deframes received data for channel 2. Correspondingly, Channel n frame module 180 frames data for transmission and channel n deframe module 185 deframes received data for channel n.

As such, this structure requires one frame module and one deframe module for each channel handled by the framer. For a single channel design, this may be close to optimal. However, when multiple channels are involved, this design does not scale well to account for additional channels. For an eight channel device, either eight separate framers (such as framer 110 for example) would be required, or a single framer with eight individual framer modules and eight individual deframe modules would be required. This potentially would cause logistical problems with regard to use of the interfaces 105 and 195, and also causes problems in terms of extra resources required and larger components.

SUMMARY

A method and apparatus for a multi-channel high speed framer is described.

In one embodiment, the invention is an apparatus. The apparatus includes a first plurality of pipeline stages suitable for data framing between a link layer and a network interface. The apparatus also includes a first memory coupled to each pipeline stage of the first plurality of pipeline stages, the first memory to store context information at predetermined stage locations for each pipeline stage. The apparatus further includes a first control logic coupled to the first memory and to each pipeline stage of the first plurality of pipeline stages, the first control logic to control transfer of data between the first memory and the first plurality of pipeline stages. Within the apparatus, each stage of the first plurality of pipeline stages is suitable for loading the context information from the first memory through first control logic and performing a sub-function of data framing.

The apparatus may also include a second plurality of pipeline stages suitable for data deframing between a link layer and a network interface. The apparatus may further include a second memory coupled to each pipeline stage of the second plurality of pipeline stages, the second memory to store context information at predetermined stage locations for each pipeline stage of the second plurality of pipeline stages. The apparatus may also include a second control logic coupled to the second memory and to each pipeline stage of the second plurality of pipeline stages, the second control logic to control transfer of data between the second memory and the second plurality of pipeline stages. Within the apparatus, each stage of the second plurality of pipeline stages may be suitable for loading the context information from the second memory through a second control logic and performing a sub-function of de-framing. The apparatus may further include a link layer interface coupled to the first plurality of pipeline stages and the second plurality of pipeline stages. The apparatus may also include a line interface coupled to the first plurality of pipeline stages and the second plurality of pipeline stages. The apparatus may also be embodied as a framer in a system which may also include a physical link layer, a network processor, and a host system interface for example.

In an alternate embodiment, the invention is a method of framing data. The method includes processing raw data within a pipeline of a plurality of stages to form framed data. The method further includes storing context data related to each stage of the plurality of stages within a memory. The method also includes controlling interaction between the memory and the plurality of stages responsive to passage of data through the stages.

In another alternate embodiment, the invention is a method of deframing data. The method includes processing framed data within a pipeline of a plurality of stages to form unframed data. The method also includes storing context data related to each stage of the plurality of stages within a memory. The method further includes controlling interaction between the memory and the plurality of stages responsive to passage of data through the stages.

BRIEF DESCRIPTION OF THE DRAWINGS

The present invention is illustrated by way of example and not limitation in the accompanying figures.

DETAILED DESCRIPTION

A method and apparatus for a multi-channel high speed framer is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Various descriptions of this document relate to devices or components being coupled together. Coupling typically denotes a relationship allowing for communication or connection between a first and second object. The first object may be directly connected to the second object. Alternatively, the first object may be directly connected to a third object which may also be directly connected to the second object, thereby achieving a coupling between the first object and the second object. As will be appreciated, the number of intermediate objects between two objects which are coupled together does not determine whether the objects are coupled, the presence of a link between the two objects indicates that the two objects are coupled together.

In general, the method and apparatus relate to operation of a framer for communications hardware. The framer may be expected to operate a number of stages to frame and/or deframe data, with each stage executing in a predetermined number of clock cycles, such that data will pass predictably through the pipeline. An associated context memory may be used to maintain status/context information during processing, allowing for processing of data from various channels or virtual channels within the pipeline, without requiring dedicated hardware for each channel.

In one embodiment, the invention is an apparatus. The apparatus includes a first plurality of pipeline stages suitable for data framing between a link layer and a network interface. The apparatus also includes a first memory coupled to each pipeline stage of the first plurality of pipeline stages, the first memory to store context information at predetermined stage locations for each pipeline stage. The apparatus further includes a first control logic coupled to the first memory and to each pipeline stage of the first plurality of pipeline stages, the first control logic to control transfer of data between the first memory and the first plurality of pipeline stages. Within the apparatus, each stage of the first plurality of pipeline stages is suitable for loading the context information from the first memory through first control logic and performing a sub-function of data framing.

The apparatus may also include a second plurality of pipeline stages suitable for data deframing between a link layer and a network interface. The apparatus may further include a second memory coupled to each pipeline stage of the second plurality of pipeline stages, the second memory to store context information at predetermined stage locations for each pipeline stage of the second plurality of pipeline stages. The apparatus may also include a second control logic coupled to the second memory and to each pipeline stage of the second plurality of pipeline stages, the second control logic to control transfer of data between the second memory and the second plurality of pipeline stages. Within the apparatus, each stage of the second plurality of pipeline stages may be suitable for loading the context information from the second memory through a second control logic and performing a sub-function of de-framing. The apparatus may further include a link layer interface coupled to the first plurality of pipeline stages and the second plurality of pipeline stages. The apparatus may also include a line interface coupled to the first plurality of pipeline stages and the second plurality of pipeline stages. The apparatus may also be embodied as a framer in a system which may also include a physical link layer, a network processor, and a host system interface for example.

In an alternate embodiment, the invention is a method of framing data. The method includes processing raw data within a pipeline of a plurality of stages to form framed data. The method further includes storing context data related to each stage of the plurality of stages within a memory. The method also includes controlling interaction between the memory and the plurality of stages responsive to passage of data through the stages.

In another alternate embodiment, the invention is a method of deframing data. The method includes processing framed data within a pipeline of a plurality of stages to form unframed data. The method also includes storing context data related to each stage of the plurality of stages within a memory. The method further includes controlling interaction between the memory and the plurality of stages responsive to passage of data through the stages.

Figure 2:
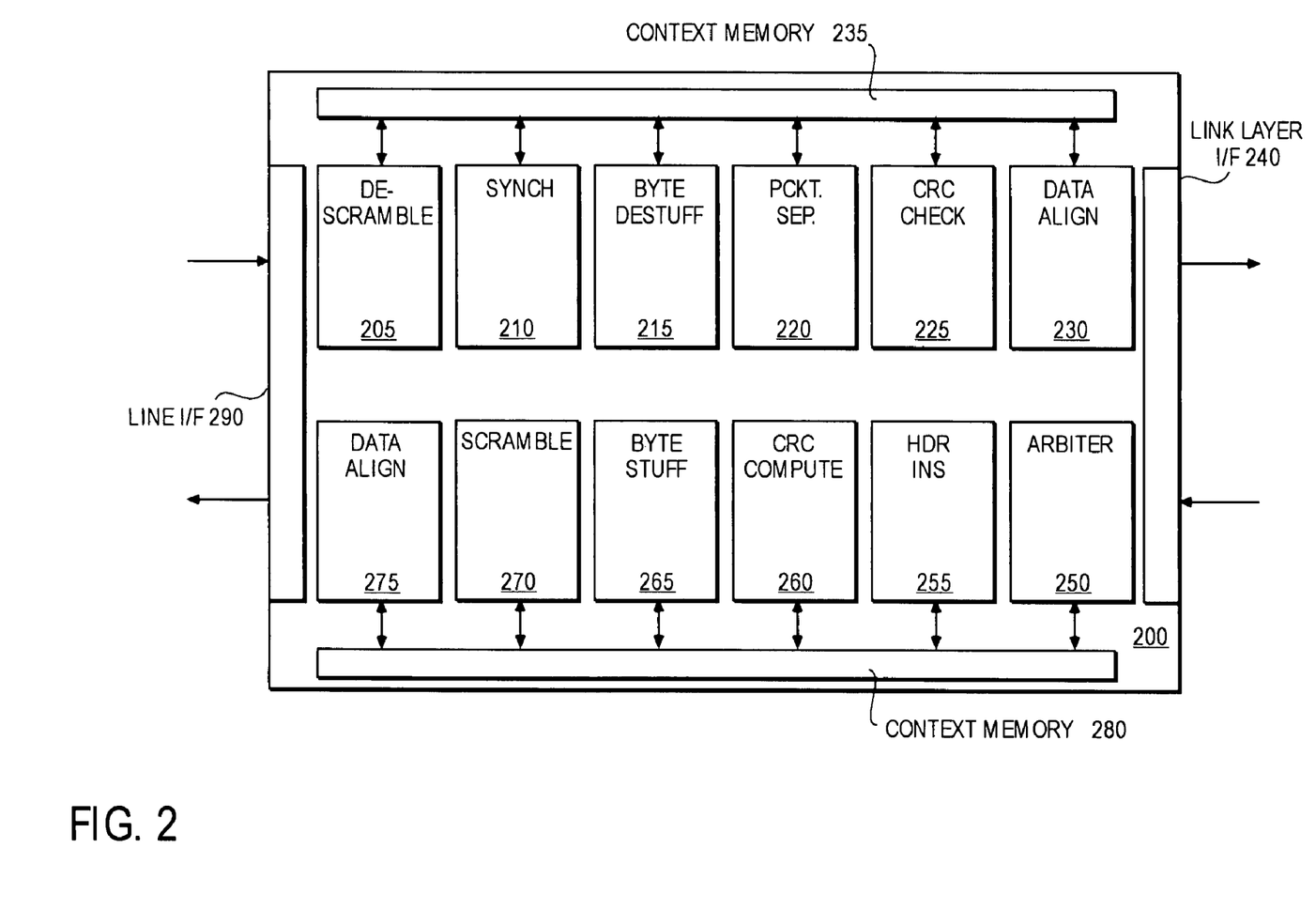
FIG. 2 illustrates an embodiment of a framer.

Preferably, the methods and apparatuses described revolve around pipelined handling of data in a framer. FIG. 2 illustrates an embodiment of a framer. Framer 200 includes a frame pipeline (stages 250, 255, 260, 265, 270, and 275) and a deframe pipeline (stages 205, 210, 215, 220, 225, and 230). Framer 200 also includes two separate context memory banks 235 and 280. Interface 240 is suitable for coupling to an internal portion of a system, such as a network processor for example. Interface 290 is suitable for coupling to a physical link layer or other low-level component used to interface with an exterior network connection.

A packet received from an exterior network may be expected to arrive at interface 290 from a physical link layer. The packet would then be passed to descramble module 205, then to synchronization module 210, to byte destuff module 215, to packet separation module 220, to CRC check module 225 and to data alignment module 230. After passage through each of these modules, the packet would be in a form suitable for use within the rest of an associated apparatus or system.

The packet would be descrambled in descramble module 205, such as through application of a known or predetermined descrambling algorithm. The packet would then be synchronized in synchronization module 210. Synchronization typically involves waiting for the start of a flag byte (0x7E) before starting the processing of data after a system reset. The packet would then have stuffed bytes (such as mapped control character 0x7D, 0x7E for example) removed in byte destuff module 215. Next, the packets would be separated out in packet separation module 220, if there are more than one packet in same transfer After that, CRC or cyclic redundancy check algorithm is used to verify the integrity of the packet in CRC check module 225.

Finally, data extracted from the packet may be aligned for storage in a memory location in data alignment module 230. At this point, the packet is ready for transport to its destination, such as by writing the data from the packet to a designated memory location.

Similarly, a packet received from a network processor may be processed within the framer for transmission using an external network. The packet may be received through interface 240, passed to arbiter module 250, to header insertion module 255, to CRC compute module 260, to byte stuffing module 265, to scramble module 270 and to data alignment module 275. After passage through each of these modules, the packet would be in a form suitable for passage through interface 290 and use in transmitting the packet along the external network.

The packet would be provided to arbiter module 250, which would arbitrate between requests for different channels and generate the request for data to a link-layer Interface/Network Processor. The packet would then be handed to header insert module 255, which would insert a header or potentially enframe (surround or sandwich with a frame for example) the packet. The packet would then be handed to CRC compute module 260, wherein the CRC checksum would be computed for use when the packet is transmitted. The packet would then be handed to byte stuffing module 265, wherein the control characters, 0×7E, 0×7D would be mapped for transparency processing. The packet would then be passed to scramble module 270, wherein the packet would be scrambled using a predetermined algorithm. The packet would then be passed to data alignment module 275, where the packet would be aligned to fit into the expected bitstream for transmission. Finally, the packet would be handed out through interface 290 for transmission.

Each of the two pipelines have had the relevant modules described. However, the general structure of these modules may also be instructive. It may be expected, in one embodiment, that each pipeline stage will require three clock cycles to accomplish its function. Moreover, in general, a predetermined number of clock cycles for each stage may be preferable. At each stage of the pipeline, contextual information is stored such that each pipeline stage has access to information about which channel or what state a particular packet is in when processing occurs. For this purpose the two context memories (240 and 285) are provided and made accessible to the various pipeline stages. Note that a single unified context memory may be appropriate in some embodiments.

Figure 3A:
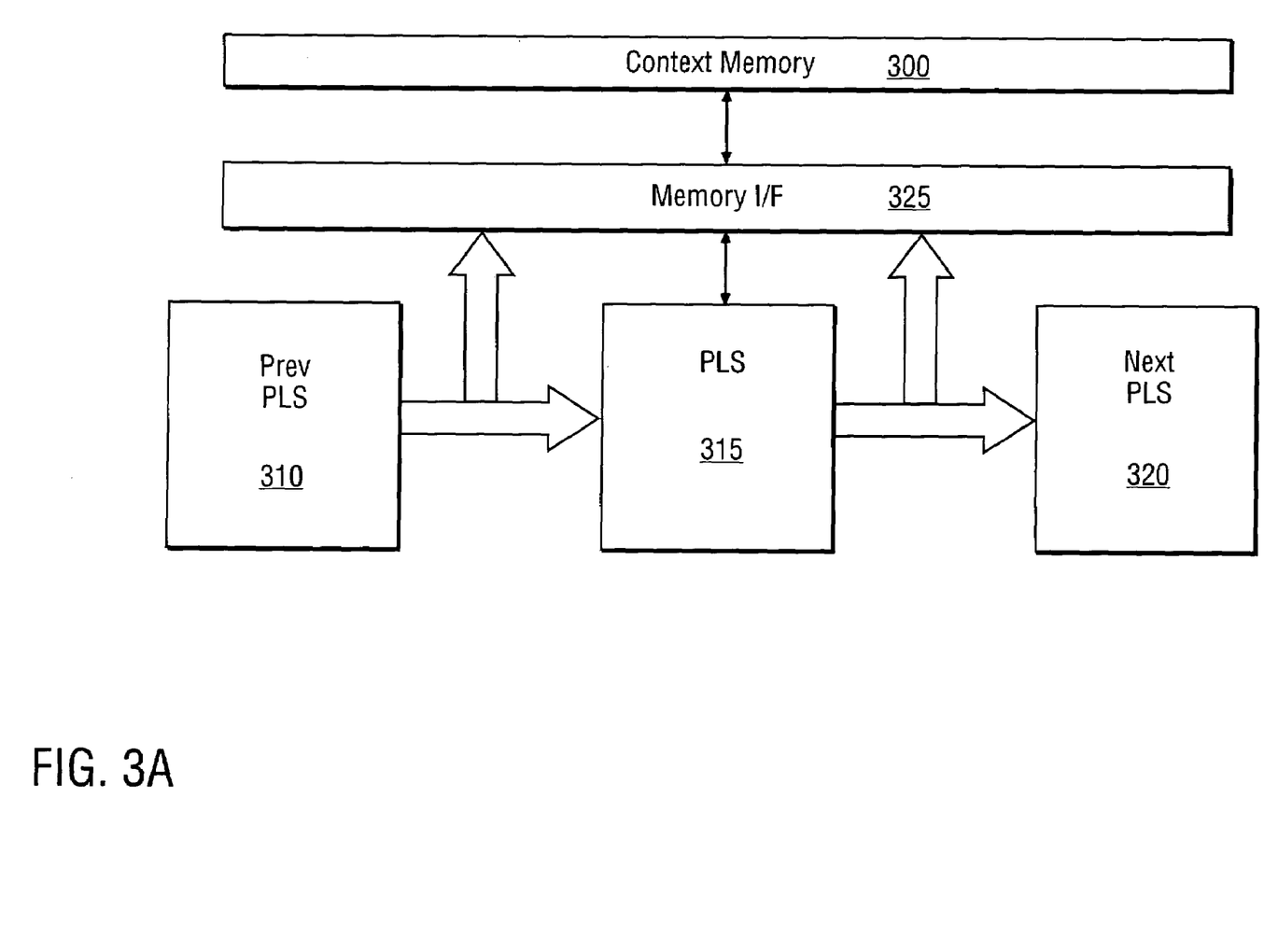
FIG. 3A illustrates an embodiment of a pipeline stage of a framer.

FIG. 3A illustrates an embodiment of a pipeline stage of a framer. Pipeline stage 315 has a preceding stage 310 and a succeeding stage 320, allowing for passage of data (such as a packet for example) from the preceding stage 310, to the pipeline stage 315, and then to the succeeding stage 320. Pipeline stage is coupled to memory interface 325, as are the data streams between pipeline stages 310 and 315, and between pipeline stages 315 and 320, allowing for exchange of both data and context information with memory interface 325 and correspondingly context memory 330. Context memory 330 is then used to store whatever status information may be useful as data transitions from one stage to the next. This status information may include an indication of the nature of the packet to be processed, an indication of the channel for transmission of the packet (such as a virtual channel for example), or other relevant status information.

Figure 3B:
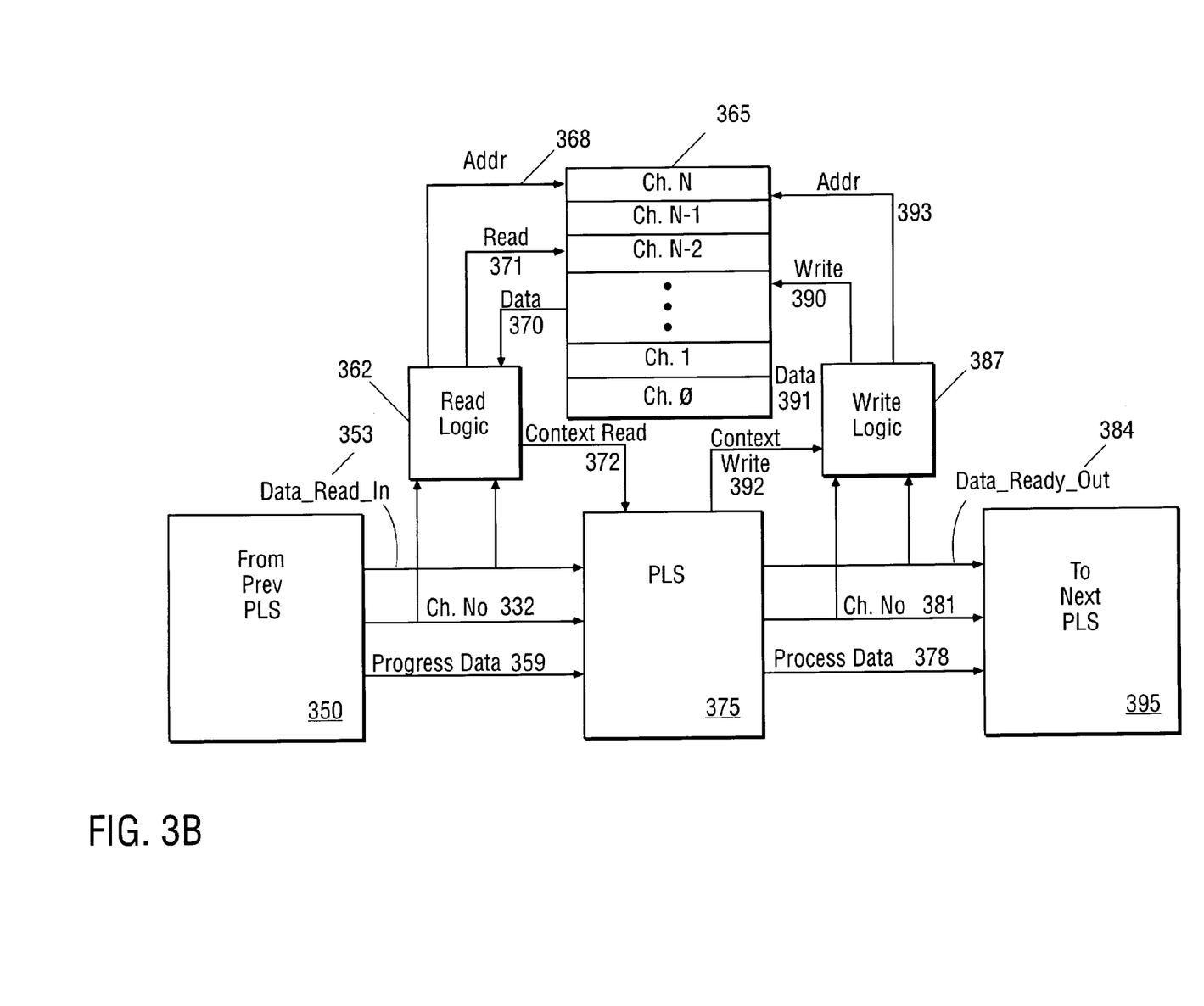
FIG. 3B illustrates an alternate embodiment of a pipeline stage of a framer.

FIG. 3B illustrates an alternate embodiment of a pipeline stage of a framer. Pipeline stage 375 has a preceding stage 350 and a succeeding stage 395, allowing for passage of data (such as a packet for example) from the preceding stage 350, to the pipeline stage 375, and then to the succeeding stage 395. Pipeline stage 375 is coupled to memory 365, as are the data streams between pipeline stages 350 and 375 (through read logic 362), and between pipeline stages 375 and 395 (through write logic 387), allowing for exchange of both data and context information with memory 365. Memory 365 is then used to store whatever status information may be useful as data transitions from one stage to the next. This status information may include an indication of which virtual channel the packet is destined for, and corresponding status information may be found at an address or set of addresses corresponding to the virtual channel in question.

Thus, process data 359, channel number 356 and data ready signal 353 may be sent from previous stage 350 to both read logic 362 and pipeline stage 375. Read logic 362 may then trigger a read from memory 365 to load the context or status data corresponding to the channel indicated by channel number 356, with the read timed based on data ready signal 353. Address 368 would be the address in memory 365 to be read based on the read signal 371, data 370 is the data read out of memory 365 and context read 372 is the data signal provided to stage 375. Similarly, when pipeline stage 375 has accomplished its function or task, it provides data ready signal 384, channel number 381 and process data 378 to next stage 395 and to write logic 387. Write logic 387 may then trigger a write to memory 365 to update the context or status data corresponding to the channel indicated by channel number 381, with the write timed based on data ready signal 384. Address 393 would be the address in memory 365 to be written based on the write signal 390, context write 392 is the data to be written as provided by stage 375 and data 391 is the data actually written to memory 365. So, each stage passes on its data directly in this embodiment, while providing context information in the context memory 365.

Figure 4A:
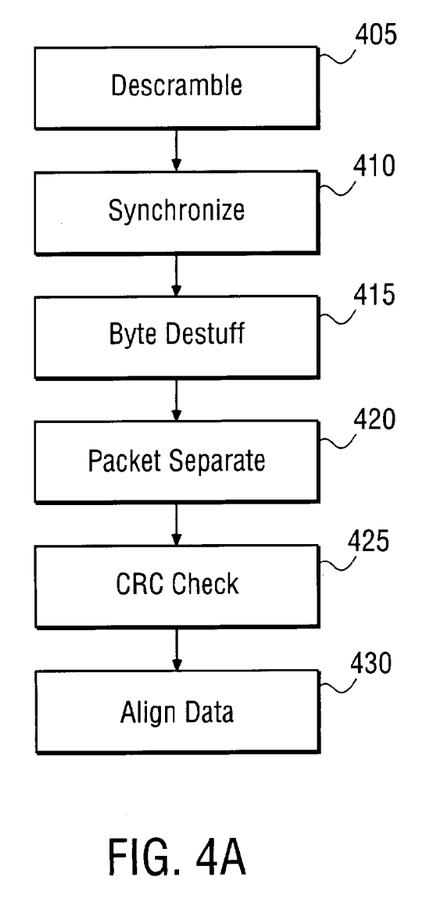
FIG. 4A illustrates an embodiment of a method of deframing a frame in flow diagram form.

Similarly to the apparatuses described, methods of performing framing and deframing in a pipelined manner may be used. FIG. 4A illustrates an embodiment of a method of deframing a frame in flow diagram form. At each block, a predetermined number of clock cycles are used to accomplish the function, such that each block requires the same number of clock cycles. At block 405, a data packet is descrambled. At block 410, the data packet is synchronized. At block 415, the data packet has stuffed or padding bytes removed. At block 420, packets are separated. At block 425, a CRC check is performed on the packet based on its internal CRC value. At block 430, data of the packet is aligned, such as for writing to memory. In this manner, a packet may be transformed from a packet suitable for use in transmission across a network to a packet or piece of data suitable for use within a system.

Figure 4B:
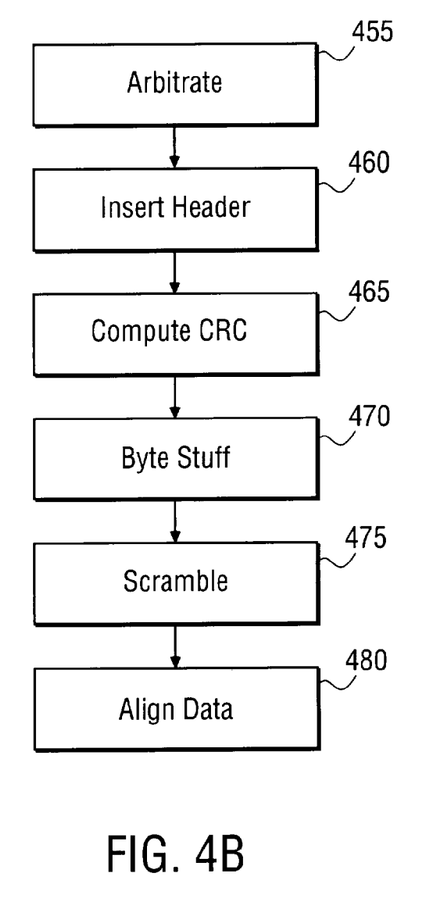
FIG. 4B illustrates an embodiment of a method of framing a frame in flow diagram form.

FIG. 4B illustrates an embodiment of a method of framing a frame in flow diagram form. Again, at each block, a predetermined number of clock cycles are used to accomplish the function, such that each block requires the same number of clock cycles. At block 455, arbitration between requests from different channels is performed. At block 460, a header for the packet is inserted. At block 465, a CRC checksum is computed for the packet, forming the end of the substantive data of the packet. At block 470, the control character mapping is performed for transparency processing. At block 475, the packet is scrambled using a predetermined scrambling algorithm. At block 480, the data of the packet is aligned for transmission purposes. In this manner, a packet may be transformed from a format useful within a system to a format useful for transmission over a network.

Figures 5, 6:
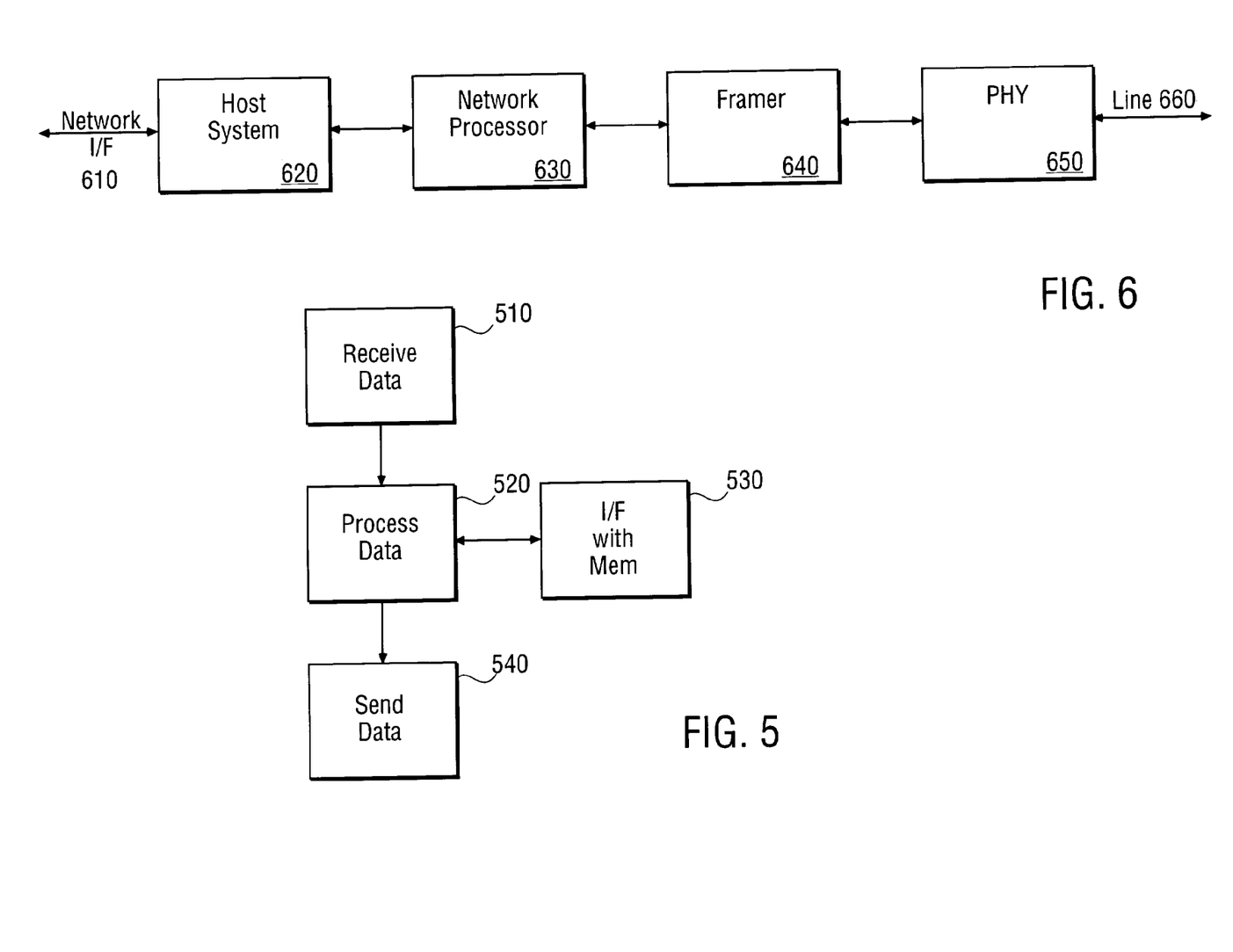
FIG. 5 illustrates an embodiment of a method of operation of a pipeline stage of a framer in one embodiment.
FIG. 6 illustrates an embodiment of a system in block diagram form.

Within either a method of a system, each pipeline stage may preferably operate in a superficially similar manner. FIG. 5 illustrates an embodiment of a method of operation of a pipeline stage of a framer in one embodiment. Each pipeline stage may be expected to operate in this manner, although the blocks need not represent each clock cycle used in performing the functions of the pipeline stage. At block 510, data is received from the previous pipeline stage, or an appropriate interface. At block 520, the data is processed, and interfacing with context memory at block 530 may accompany this processing. At block 540, the processed data is sent to the next pipeline stage or to an interface for provision to the rest of the system or network as appropriate.

As use of a framer in a system has been discussed, whether the framer implements pipelining or not, such a system may be profitably illustrated. FIG. 6 illustrates an embodiment of a system in block diagram form. Data is received and sent on line 660, which may be a fiber optic cable for example. Coupled to line 660 is physical layer 650, which translates signals from line 660 into a form suitable for use by circuitry, such as through optoelectronic transformation or level-shifting for example. Coupled to physical layer 650 is framer 640, which operates to frame or deframe data for transmission or reception. Coupled to framer 640 is network processor 630, which may be used to process data for transmission or reception. Coupled to network processor 630 is host system 620, which may transfer data between network processor 630 and a network interface 610 which couples to an internal network. Framer 640 may be implemented as in the embodiment illustrated with respect to FIG. 2 (such as framer 200 for example). Moreover, framer 640 may be implemented as in the embodiment illustrated with respect to FIGS. 4A and 4B, thereby performing the methods of those two Figures.

In the foregoing detailed description, the method and apparatus of the present invention has been described with reference to specific exemplary embodiments thereof. It will, however, be evident that various modifications and changes may be made thereto without departing from the broader spirit and scope of the present invention. In particular, the separate blocks of the various block diagrams represent functional blocks of methods or apparatuses and are not necessarily indicative of physical or logical separations or of an order of operation inherent in the spirit and scope of the present invention. For example, the various blocks of FIG. 2 may be integrated into components, or may be subdivided into components. Similarly, the blocks of FIG. 4A or 4B (for example) represent portions of a method which, in some embodiments, may be reordered or may be organized in parallel rather than in a linear or step-wise fashion. The present specification and figures are accordingly to be regarded as illustrative rather than restrictive.

What is claimed is:

1. A framer comprising:
a first plurality of pipeline stages to frame data between a link layer and a network interface;
a first memory coupled to each pipeline stage of the first plurality of pipeline stages, the first memory to store context information at predetermined stage locations for each pipeline stage; and
a first control logic coupled to the first memory and to each pipeline stage of the first plurality of pipeline stages, the first control logic to control transfer of data between the first memory and the first plurality of pipeline stages;
and wherein each stage of the first plurality of pipeline stages is to load context information from the first memory through the first control logic and to perform a sub-function of data framing.

2. The framer of claim 1, further comprising:
a second plurality of pipeline stages to deframe data between a link layer and a network interface each stage of the second pipeline stage to load context information from a second memory through a second control logic and to perform a sub-function of data deframing.

3. The framer of claim 2, further comprising:
a second memory coupled to each pipeline stage of the second plurality of pipeline stages, the second memory to store context information at predetermined stage locations for each pipeline stage of the second plurality of pipeline stages.

4. The framer of claim 3, further comprising:
a second control logic coupled to the second memory and to each pipeline stage of the second plurality of pipeline stages, the second control logic to control transfer of data between the second memory and the second plurality of pipeline stages.

5. The framer of claim 4, further comprising:
a link layer interface coupled to the first plurality of pipeline stages and the second plurality of pipeline stages.

6. The framer of claim 5, further comprising:
a line interface coupled to the first plurality of pipeline stages and the second plurality of pipeline stages.

7. The framer of claim 1, wherein
the first control logic, first memory and first plurality of pipeline stages are all included in a framer; and
further comprising:
a line interface of the framer coupled to a physical link layer.

8. The framer of claim 7, further comprising:
a link layer interface of the framer coupled to a network processor.

9. A method of framing data, comprising:
processing raw data within a pipeline of a plurality of stages to form framed data;
storing context data related to each stage of the plurality of stages within a memory; and
controlling interaction between the memory and the plurality of stages responsive to passage of data through the stages.

10. The method of claim 9, further comprising:
receiving raw data from a link layer interface.

11. The method of claim 9, further comprising:
providing framed data to a line interface.

12. The method of claim 9, wherein:
the stages include a header insert stage, a CRC computation stage, a byte stuffing stage, and a data alignment stage.

13. The method of claim 12, wherein
the stages further include a scrambling stage.

14. The method of claim 13, wherein
the stages further include an arbitration stage.

15. The method of claim 14, wherein
each stage of the plurality of stages processes data within the same predetermined number of clock cycles.

16. A method of deframing data, comprising:
processing framed data within a pipeline of a plurality of stages to form unframed data;
storing context data related to each stage of the plurality of stages within a memory; and
controlling interaction between the memory and the plurality of stages responsive to passage of data through the stages.

17. The method of claim 16, further comprising:
receiving framed data from a line interface.

18. The method of claim 16, further comprising:
providing unframed data to a link layer interface.

19. The method of claim 16, wherein:
the stages include a synchronizer stage, a packet separator stage, a CRC checker stage, a byte destuffing stage, and a data alignment stage.

20. The method of claim 19, wherein:
the stages further include a descrambling stage.

21. The method of claim 16, further comprising:
receiving framed data from a line interface;
providing unframed data to a link layer interface;
and wherein:
the stages include a descrambling stage, a synchronizer stage, a packet separator, a CRC checker stage, a byte destuffing stage, and a data alignment stage.

22. The method of claim 21, wherein:
each stage of the plurality of stages processes data within the same predetermined number of clock cycles.

23. A framer, comprising:
a pipeline formed of a plurality of means for processing data, the pipeline to process raw data to form framed data;
means for storing context data related to each stage of the plurality of stages within a memory; and
means for controlling interaction between the memory and the plurality of means for processing responsive to passage of data through the means for processing.

24. The framer of claim 23, further comprising:
means for receiving raw data from a first external component.

25. The framer of claim 23, further comprising:
means for providing framed data to a second external component.

26. The framer of claim 23, wherein
the plurality of means for processing data include a means for synchronizing, a means for separating packets, a means for checking a CRC, a means for destuffing bytes, and a means for aligning data.

* * * * *